United States Patent
Arvola et al.

(10) Patent No.: US 8,133,460 B2
(45) Date of Patent: Mar. 13, 2012

(54) METHOD FOR THE PREPARATION OF A REDUCING AGENT COMPOSITION

(75) Inventors: Jouko Arvola, Oulu (FI); Timo Härmä, Espoo (FI); Eero Hätälä, Oulu (FI); Lauri Määttä, Oulu (FI); Timo Nissinen, Ylöjärvi (FI); Pentti Pekonen, Oulu (FI)

(73) Assignee: Kemira Oyj, Helsinki (FI)

( * ) Notice: Subject to any disclaimer, the term of this patent is extended or adjusted under 35 U.S.C. 154(b) by 129 days.

(21) Appl. No.: 12/526,302

(22) PCT Filed: Feb. 14, 2008

(86) PCT No.: PCT/FI2008/050062

§ 371 (c)(1),
(2), (4) Date: Dec. 7, 2009

(87) PCT Pub. No.: WO2008/099063

PCT Pub. Date: Aug. 21, 2008

(65) Prior Publication Data

US 2010/0084606 A1 Apr. 8, 2010

(30) Foreign Application Priority Data

Feb. 15, 2007 (FI) .................................... 20070134

(51) Int. Cl.
*B01D 53/54* (2006.01)
(52) U.S. Cl. ........................................................ 423/212
(58) Field of Classification Search ................ None
See application file for complete search history.

(56) References Cited

U.S. PATENT DOCUMENTS

| 3,122,584 A | 2/1964 | Kelly et al. |
| 5,057,293 A | 10/1991 | Epperly et al. |
| 5,116,584 A | 5/1992 | Chen et al. |
| 6,387,336 B2 * | 5/2002 | Marko et al. .................. 423/212 |

FOREIGN PATENT DOCUMENTS

| GB | 1111936 | 5/1968 |
| WO | 9217402 A1 | 10/1992 |
| WO | 2004069385 A1 | 8/2004 |
| WO | 2006013229 A1 | 2/2006 |

OTHER PUBLICATIONS

International Search Report; International Application No. PCT/FI2008/050062; Date of Mailing of ISR; May 15, 2008; 2 pages.
Written Opinion of the International Searching Authority; International Application No. PCT/FI2008/050062; International Filing Date Feb. 14, 2008; 5 pages.

* cited by examiner

*Primary Examiner* — Necholus Ogden, Jr.
(74) *Attorney, Agent, or Firm* — Thomas, Kayden, Horstemeyer & Risley, LLP

(57) ABSTRACT

The invention relates to a method for preparing a reducing agent composition, which is used in the selective catalytic reduction of nitrogen oxides and which contains from 20 to 40% by weight of urea, from 20 to 40% by weight of ammonium formate, and water. The composition is prepared by adding urea to the aqueous solution of ammonium formate that is prepared in situ, and by preparing the aqueous solution of ammonium formate using, as starting materials, a source of ammonium, a source of formate, and water.

15 Claims, 1 Drawing Sheet

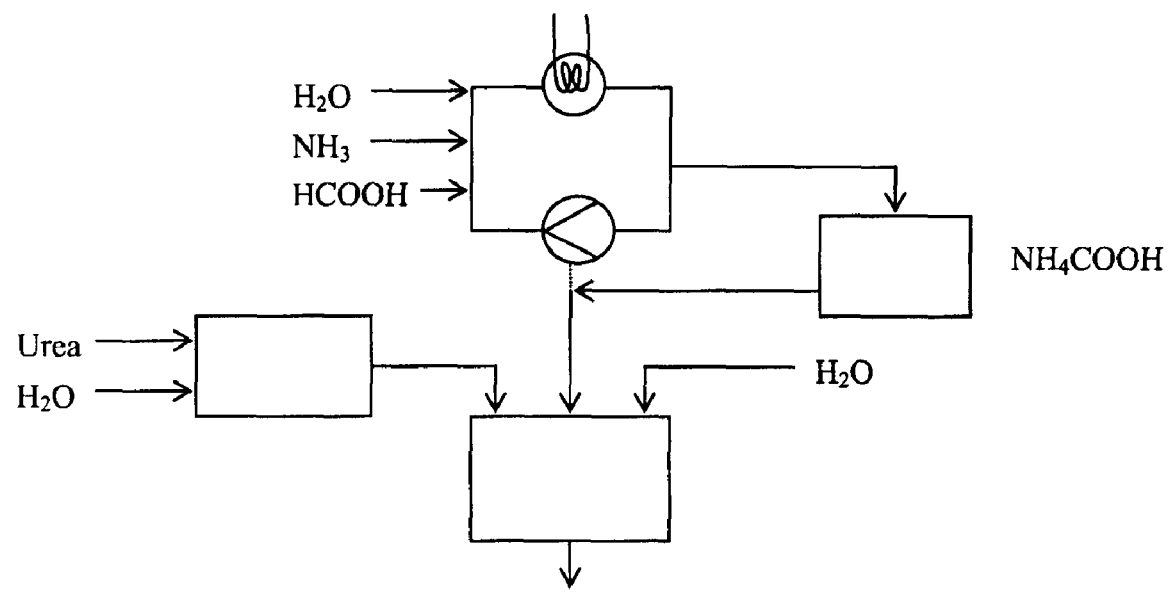

METHOD FOR THE PREPARATION OF A REDUCING AGENT COMPOSITION

CROSS REFERENCE TO RELATED APPLICATIONS

This is a U.S. national stage of application No. PCT/FI2008/050062, filed on 14 Feb. 2008. Priority under 35 U.S.C. §119(a) and 35 U.S.C. §365(b) is claimed from Finland Patent Application No. 20070134, filed 15 Feb. 2007, the disclosure of which is also incorporated herein by reference.

FIELD OF TECHNOLOGY

The invention relates to a method for preparing a reducing agent composition that is used in the selective catalytic reduction of nitrogen oxides, the reducing agent comprising from 20 to 40% by weight of urea, from 20 to 40% by weight of ammonium formate, and water.

BACKGROUND

Nitrogen oxides ($NO_x$) in the flue gases of combustion processes constitute a considerable environmental hazard. These gases are generated, for example, in the motors of vehicles, such as diesel cars. The amount of nitrogen oxides contained in the exhaust gases in the flue gases can be decreased by reducing them into nitrogen gases ($N_2$). Conventionally, in what is called a selective catalytic reduction (SCR), a urea solution with a concentration of 32.5% has been used to decrease the amount of $NO_x$ gases, the solution being fed into an exhaust manifold before an SCR catalytic converter. The ammonia that is released from the solution reduces the $NO_x$ gases contained in the exhaust gases and, as a result of the reduction reaction, nitrogen ($N_2$) and water exit the catalytic converter.

The previous patent applications of the applicant, FI20030168 and FI20041057 disclose alternatives for the urea solution, using, instead of the urea solution, an aqueous solution containing urea and ammonium formate. Such a solution has the advantage, among others, that its frost resistance is better than that of the urea solution. Using the solution, frost resistances of as low as −30° C. are achieved, whereas those of the conventional urea solution are only −11° C. at the lowest. In certain applications, the solution formed by the mixture of urea and ammonium formate can be used alternatively instead of or in addition to the standard urea solution. In that case, by changing the mixture ratio by increasing the portion of ammonium formate, for example, the efficiency of the solution can be modified for various applications. The solution compound can contain an essentially larger amount of usable ammonia than the urea solution alone, whereby the catalyst solution in question can be used for driving a longer distance by one refueling. In heavy traffic applications, a considerably longer distance can thus be driven using the same tank size without refueling, compared to the urea solution, or in passenger car applications, the refueling can be optimized to be carried out in connection with other maintenance procedures, whereby the maintenance intervals can be as long as 20000-30000 km. Such a compound can also be used to exploit the stability of ammonium formate that is better than that of urea in storage, and its preservation properties in preventing the contaminations of the solution compound. Furthermore, ammonium formate decomposes completely even at low temperatures, thus enabling a better conversion, which provides the benefit that the deposits accumulating in the exhaust manifold decrease compared to, for example, the use of pure urea solutions. The cubic expansion occurring in connection with freezing is also lesser for the solution compound compared to water or urea solutions.

In the selective catalytic reduction, the reducing agent that is fed into the exhaust manifold should be extremely pure to prevent the deactivation of the SCR catalyst. The catalytic converter must withstand automobile use as long as possible, so that the expensive catalytic converter does not have to be replaced during the service life of the car. Combustion of diesel and the use of lubricating oils also bring deactivating components to the catalyst; therefore, it is appropriate to try to minimize the amounts of substances that come along with the reducing agent and deactivate the catalyst. Accordingly, the reducing agent composition that is used should contain as few components as possible, which deactivate the catalyst or bring to the exhaust gases other undesired products, which are harmful to humans or environment. In practice, the disintegration products of the reducing agent are allowed to include water and carbon dioxide only, and, of course, ammonia, which, when reducing, is converted into nitrogen gas.

For the urea solution, there is a German DIN standard, which defines the degree of purity required. An ISO standard for the urea solution is also in preparation, its purity requirements being even stricter than those of the DIN standard. On completion of the ISO standard, the requirement of purity will most likely be in accordance with Table 1.

TABLE 1

| Property | Unit | Limit Min | Limit Max |
|---|---|---|---|
| Urea content[a,e] | % (m/m)[d] | 31.8 | 33.2 |
| Density 20° C.[b,e] | kg/cm³ | 1087 | 1093 |
| Refractive index 20° C.[c,e] | — | 1.3814 | 1.3843 |
| Alkalinity as $NH_3$[e] | % (m/m)[d] | — | 0.2 |
| Biuret[e] | % (m/m)[d] | — | 0.3 |
| Aldehydes[e] | mg/kg | — | 5 |
| Insolubles[e] | mg/kg | — | 20 |
| Phosphate ($PO_4$)[e] | mg/kg | — | 0.5 |
| Calcium | mg/kg | — | 0.5 |
| Iron | mg/kg | — | 0.5 |
| Copper | mg/kg | — | 0.2 |
| Zinc | mg/kg | — | 0.2 |
| Chrome | mg/kg | — | 0.2 |
| Nickel | mg/kg | — | 0.2 |
| Aluminum[e] | mg/kg | — | 0.5 |
| Magnesium | mg/kg | — | 0.5 |
| Sodium | mg/kg | — | 0.5 |
| Potassium | mg/kg | — | 0.5 |
| Identifiability[e] | — | Identical compared to the reference | | wherein
[a]Target value is 32.5% (m/m)
[b]Target value is 1089.5 kg/m3
[c]Target value is 1.3829
[d]Term "% (m/m)" is used to describe the mass ratio of the material
[e]Requirement according to the future ISO standard.

These very strict purity requirements limit the purity of the raw materials used and set strict requirements for the material. The ISO standard will include recommendations for the structural materials used.

Correspondingly, when replacing the conventional urea solution with the reducing agent composition containing urea and formate, it should meet the same purity criteria, which sets limits on the raw materials and the equipment that are used in the preparation of the solution composition.

Solid urea, which is mainly used in fertilizing, is conventionally quite impure, and because of its hygroscopicity, the product must often be coated to prevent caking. The most common coating agents of urea contain formaldehyde, urea-formaldehyde, and surfactants, such as alkyl acryl sulfonates, their amounts being strictly defined by the standards mentioned above. In practice, the purity requirements described above prevent the use of coated urea as such in the preparation of the solution-like reducing agent.

When preparing the reducing agent composition containing urea and ammonium formate, the urea starting material that is used must thus comprise pure uncoated urea, such as technical grade urea or a strong urea solution directly from a urea plant to achieve the required purity. Naturally, this keeps the material costs high. In practice, the use of normal bulk raw material exceeds the allowable purity criteria, whereby the only alternative is to use raw material that is delivered in flexible intermediate bulk containers or freight containers, or to introduce raw material in liquid form directly from the urea plant.

Patent specification GB1111936 describes tests for decreasing the freezing point by using mixtures of urea and ammonium formate. The essentially solid starting materials are simply mixed together and the solution is dissolved in water.

Several patent specifications, such as U.S. Pat. No. 6,387,336 and WO9217402, describe separate solutions of urea and ammonium formate and combined solutions, which are prepared by first dissolving the solid starting material, urea or ammonium formate, in water, and then combining the aqueous solutions thus obtained.

Patent specification U.S. Pat. No. 3,122,584 discloses the preparation of ammonium formate by hydrolyzing from methyl formate in the presence of an acid catalyst and by adding ammonia to the reaction mixture to provide a mixture containing ammonium formate. The ammonium formate formed in the method described herein is separated out of the reaction mixture, typically, by centrifuging the evaporated reaction mixture and recovering the ammonium formate crystals by filtering for subsequent use.

As is well known, the aqueous solution formed by ammonium formate and urea has been prepared from solid starting materials, solid urea and solid ammonium formate by dissolving them in water.

The preparation of solid or concentrated ammonium formate consumes energy because of the great need of evaporation and, furthermore, concentrated ammonium formate of more than 50% is difficult to handle because of its tendency to crystallize.

Correspondingly, the direct mixing of ammonia and formic acid with the aqueous solution of urea easily results in an increase in temperature, whereby the urea begins to decompose. In that case, the control of the exact composition of the end product becomes difficult and the end result might be a non-homogeneous product.

The purpose of the present invention is to disclose a method for preparing a reducing agent composition that is used in the catalytic reduction of nitrogen oxides, avoiding the problems described above. In particular, the purpose is to disclose a method of preparing the reducing agent compositions described in patent applications FI20030168 and FI20041057.

Another purpose of the invention is to disclose a method, which provides a reducing agent composition that meets the purity requirements according to those described above.

In the literature, no manufacturing method for such a reducing agent composition has been disclosed. Neither are there available any information about the solubility of a ternary system formed by urea, ammonium formate, and water.

DESCRIPTION OF THE INVENTION

The manufacturing method according to the present invention for preparing the reducing agent composition used in the catalytic reduction of nitrogen oxides, the reducing agent composition comprising urea, ammonium formate, and water, is described in the independent claim 1.

The method according to the invention is used to prepare the reducing agent composition containing urea, ammonium formate, and water by adding urea to the aqueous solution of ammonium formate. The aqueous solution of ammonium formate in question is prepared from its starting materials in situ. The starting materials used comprise a source of ammonium, preferably ammonia, more preferably liquid ammonia, a source of formate, preferably formic acid or methyl formate, and water.

The method according to a preferred embodiment of the invention is used to prepare a reducing agent composition containing urea, ammonium formate and water in a two-stage process (Stages A and B) so that at the first Stage A, first, an aqueous solution of ammonium formate is essentially prepared from starting materials other than the solid ammonium formate, and at the second Stage B, urea is added to this aqueous solution of ammonium formate that was provided at Stage A. When the aqueous solution of ammonium formate is prepared in situ directly from its starting materials, without separate intermediate stages or by using, as the starting material, the solid ammonium formate that was separately prepared, achieving a concentration suitable for the end product as early as at Stage A, and by conveying the prepared solution immediately to the following Stage B, the cold-resistant reducing agent composition formed by urea and the aqueous solution of ammonium formate can be produced in a chemically, process-technically and energy-efficiently advantageous manner. In this way, a reducing agent composition with a desired concentration is obtained directly and, for example, no expensive dehydration is needed.

An alternative method according to a preferred embodiment of the invention is used to prepare a reducing agent composition containing urea, ammonium formate, and water in a one-stage process so that in a tube reactor, essentially at Stage A according to the embodiment described above, urea is added directly to the circulation of the tube reactor. Urea is preferably added as a strong starting material, whereby it is kept in liquid form or in the solution form by heating. This can be implemented so that the liquid flow of urea is taken directly from the urea plant and conveyed to the reduction composition process. In that case, it is preferable to prepare the reducing agent composition in close proximity to the urea plant.

One advantage of the method according to the invention compared with previous manufacturing methods is that, when so desired, the final solution concentrations are directly obtained in full or nearly full. In the previous manufacturing methods, solid ammonium formate has been used as starting material. In that case, the preparation of the desired reducing agent composition has also included the process stages needed for the preparation of the starting material, which are now omitted from the method according to the invention. In the method according to the invention, no separate crystallization of ammonium formate is needed to prepare the solid intermediate product or the starting material, whereby also the separation stage of crystals and the drying stage are unnecessary. The process is simplified, whereby its reliability of operation is improved and the investment and operating costs are reduced. When the reducing agent composition is prepared by the method according to the invention, using the aqueous solution of ammonium formate as intermediate product, the magnitude of the tendency to crystallize decreases and the problems caused by the crystallization, such as pumping problems, are eliminated.

The aqueous solution of ammonium formate is preferably prepared in a tube reactor. This tube reactor may contain one or more devices for cooling the reacting aqueous solution, evaporating the water, and circulating the solution. The mixing of the reacting solution is preferably provided by circulating the solution in the tube reactor. The mixing is effective and a homogeneous product is provided, when the circulation speed is sufficient. Cooling is preferably provided by means of a cooling jacket, its use also enabling heating. In this way, the heating or the cooling of the solution that is treated can be implemented in a simple and inexpensive manner. Furthermore, the pressure control may be easier and the use may be simpler than in a continuous stirred tank reactor, for example.

The first Stage A of the manufacturing method according to the two-stage embodiment described above can be implemented by making the starting materials, i.e., formic acid, ammonia, preferably liquid ammonia, and water to react by feeding them into the reactor. In that case, an aqueous solution is generated with respect to the intermediate product, amm1onium formate, being preferably an aqueous solution of 20 to 55% by weight, more preferably an aqueous solution of about 40 to 50% by weight, in accordance with reaction (i)

$$NH_3+HCOOH+H_2O \rightarrow NH_4COOH+H_2O \qquad (i).$$

Generally, the liquid ammonia, which is used as the starting material, is extremely pure as a liquefied gas, being essentially below the impurity limits defined for the final reduction composition.

The strong formic acid that is used as starting material has a concentration of 85% by weight or more, preferably 90% by weight or more, more preferably 98.5% by weight or more. The equipment used for the preparation of formic acid employs special materials, such as extra acid-resistant steel or zirconium to prevent corrosion. Clearly, the impurity contents of formic acid remain essentially below the contents mentioned in Table 1, making it possible to use slightly more impure urea, and still keep the impurity contents of the final reduction composition below the target values.

The water that is used as starting material is very clean demineralized water (DW).

The reactor used at Stage A is preferably a tube reactor. During the reactions, the tube reactor is over-pressurized, the over pressure preferably being from 1 to 2 bar. The temperature in the reactor depends on the intensity of the cooling used, and it is typically within 20 and 80° C. Without cooling, the temperature is within 50 and 70° C. The intensity of the cooling depends on the temperature of the water used, varying within 1 and 20° C., according to the type of cooling water and the season.

The manufacturing process of the aqueous solution of ammonium formate can be batch-operated or continuous, preferably continuous, whereby the equipment construction needed is smaller and easier to automate. In addition, the controllability of the process improves and the end result is a more homogeneous product.

FIG. 1 shows an embodiment according to the invention, wherein the starting materials 1 formic acid, HCOOH, and 2 liquid ammonia, NH$_3$, which are to be reacted, are separately fed into the tube reactor, whereby the reaction mix that is circulated in the reactor by means of a pump 3 can be cooled or heated, when needed, by means of a heat exchanger 4. An intermediate solution 5, the aqueous solution of ammonium formate, can be removed from the tube reactor through a discharge valve 6 into an intermediate storage or directly to Stage ii. An addition of water at the first stage can be used to adjust the water balance at the second stage. Depending on the desired concentration of the end product, water is added at the first stage to the extent so that, at the second stage, as small an amount of water as possible has to be evaporated or, preferably, none. As evaporation is always an expensive process stage, this is important in view of the operating expenses.

If a 20% ammonium formate solution is to be achieved as the end product, then, an ammonium formate solution of about 40% by weight after the first stage is a preferable concentration.

Alternatively, the first Stage A of the manufacturing method according to the invention can be implemented by reacting, as starting materials, methyl formate, ammonia, preferably liquid ammonia, and water, from which an aqueous solution with respect to the ammonium formate is generated, preferably an aqueous solution of 20 to 55% by weight, more preferably an aqueous solution of 40 to 50% by weight, in accordance with the reaction (ii)

$$NH_3+HCOOCH_3+H_2O \rightarrow NH_4COOH+CH_3OH \qquad (ii),$$

mainly as described in patent specification U.S. Pat. No. 3,122,584; however, with the distinction that the reaction according to the invention uses a water surplus, and the ammonium formate thus formed is not separated out of the solution. In that case, the final evaporation, the crystallization of formate, and the separation of crystals are not needed, and the advantages mentioned above are achieved by the method according to the invention.

In that case, the methyl formate that is used as the starting material is at least of 97% by weight and, possibly, contains methanol as an impurity, typically in an amount of less than 3% by weight, potassium, iron, chrome and/or zinc, preferably less than 1 ppm. The other starting materials are as described above.

If the intermediate solution is prepared by means of the reaction (ii), the methanol thus formed can be separated out of the aqueous solution of ammonium formate in a separate process stage. Methanol is preferably separated by distillation or evaporation by any method known in the art.

The intermediate product that is obtained from the first Stage A of the two-stage method, the aqueous solution of ammonium formate, preferably an aqueous solution of 20 to 55% by weight, more preferably an aqueous solution of 40 to 50% by weight, can be conveyed directly to the second Stage B or to the storage tank to wait for further processing.

At the second Stage B of the two-stage method, the aqueous solution of ammonium formate obtained from the first Stage A and urea are mixed together, for example, in a continuous stirred tank reactor, which comprises equipment for preferably mixing the solution by circulation. When so needed, water can further be added to the continuous stirred tank reactor to adjust the final solution concentration. Furthermore, equipment for circulating, heating and cooling the solution can be adapted to the reactor to heat or cool the solution in the reactor, as needed.

In the method according to the invention, the urea that is used as the starting material can be added as solid urea or as a strong fluid or liquid urea or a urea solution. If urea is in the solid form, it can be added by means of a belt conveyor, for example, or some other equipment or means known in the art. When so needed, urea can be kept in the liquid form by means of heating. The urea concentration is preferably from 20 to 100% by weight, more preferably over 99%.

Corrosion inhibitors or other reducing components, which can prevent corrosion and/or decrease the freezing point of the solution, can also be added to the reducing agent composition, which is obtained as the end product and contains from 20 to 40% by weight of urea, from 20 to 40% by weight of ammonium formate, and water.

As the starting materials that are used, such as ammonia and formic acid, are very pure, the impurity level needed for the final reducing agent composition is obtained easier than when using exclusively, as the reducing agent, a 32.5% urea solution, which is prepared from solid urea.

In the following, the method according to the invention is illustrated by means of examples; however, without limitation thereto.

EXAMPLES

Example 1

2532.4 kg/h of formic acid of 85% (Kemira), 798.7 kg/h of liquid ammonia (Kemira), and 4068.9 kg/g of water (DW) were fed into a continuous water-cooled tube reactor. The test run lasted for 1.5 hours, during which time about 11 m$^3$ of product was manufactured. During the test, the reactor was cooled with water, the temperature of the water being from 2 to 3° C. The temperature of the ammoniation reaction increased to 24.3° C., at its highest.

On the basis of laboratory analyses, the composition of the intermediate product thus obtained was 40.2% of ammonium formate and 59.8% of water, its pH being 7.0.

Example 2

A reducing agent composition, which contained 40 l of urea and ammonium formate that was prepared according to Example 1, and water, was prepared in an open reactor, which was provided with a mixer and a steam heating unit.

First, 30 l of an aqueous solution of ammonium formate of 40% by weight were added to the reactor. The solution was heated by the steam heating unit to evaporate the water, until the ammonium formate content of the solution was 50% by weight. The total amount of solution thus obtained was 23.44 liters and the density of the solution was 1.12 kg/dm$^3$. 11.1 kg of urea (technical grade) in a solid form were added to the ammonium formate solution thus obtained, whereby the solution cooled off. The solution was heated by the steam heating unit to room temperature, whereby the urea dissolved.

The analysis of the thus obtained reducing agent composition was: 30% of urea, 35.2% of ammonium formate, and 34.9% of H$_2$O. The measured freezing point was −12° C.

Example 3

Two solutions were prepared from ammonium formate and urea according to Examples 1 and 2. The analysis results according to Table 1 were obtained for the solutions.

TABLE 1

|  | Solution 1 | Solution 2 |
|---|---|---|
| Urea | 25.4 | 19.4 |
| Ammonium formate | 19.5 | 28.7 |
| H2O | 56.3 | 52.9 |
| Ca | 0.8 | 2.6 |
| Fe | <0.2 | <0.2 |
| Mg | 0.3 | 1.3 |
| Al | <0.5 | <0.5 |
| Na | <0.5 | <0.5 |
| K | <0.5 | <0.5 |
| Density | 1.11 | 1.12 |
| Freezing point | −23 | −30 |

The solutions thus obtained meet the quality criteria required, and their freezing points are very low compared to the frost resistance of the conventional urea solutions.

The invention claimed is:

1. A method for preparing a reducing agent composition, which is used in the selective catalytic reduction of nitrogen oxides and comprises from 20 to 40% by weight of urea, from 20 to 40% by weight of ammonium formate, and water, the method comprising: preparing an aqueous solution of ammonium formate prepared in situ using, as starting materials, a source of ammonium, a source of formate, and water; and adding urea to the aqueous solution of ammonium formate.

2. The method according to claim 1, wherein the source of ammonium is ammonia.

3. The method according to claim 1, wherein the source of formate is formic acid or methyl formate.

4. The method according to claim 1, wherein
first, at Stage A, an aqueous solution of ammonium formate of 20 to 55% by weight is prepared (i) from formic acid, ammonia, and water, or (ii) from methyl formate, ammonia, and water, and urea is mixed, at a separate Stage B, with the aqueous solution of ammonium formate of 20 to 55% by weight that was obtained at Stage A,
or alternatively,
the aqueous solution of ammonium formate of 20 to 55% by weight is prepared in a tube reactor (i) from formic acid, ammonia, and water, or (ii) from methyl formate, ammonia, and water, and urea is added directly to the circulation of the tube reactor in question at the same process stage.

5. The method according to claim 4, wherein the aqueous solution of ammonium formate is prepared in the tube reactor; and wherein the tube reactor comprises equipment for cooling the aqueous solution, evaporating the water, and mixing the aqueous solution.

6. The method according to claim 1, wherein the aqueous solution of ammonium formate is prepared at overpressure.

7. The method according to claim 1, wherein the aqueous solution of ammonium formate is prepared at a temperature of 20 to 80° C.

8. The method according to claim 4, wherein the aqueous solution of ammonium formate is mixed by circulating the aqueous solution, which is to be reacted, in the tube reactor.

9. The method according to claim 4, wherein the aqueous solution of ammonium formate is prepared from methyl formate, ammonia, and water; and wherein the method further comprises separating out of the aqueous solution of ammonium formate the methanol generated in the reaction of ammonia with methyl formate.

10. The method according to claim 1, wherein the source of formate is formic acid at a concentration of 85% by weight or more.

11. The method according to claim 1, wherein the source of formate is formic acid at a concentration of 90% by weight or more.

12. The method according to claim 1, wherein the urea is solid urea.

13. The method according to claim 1, wherein the urea is in liquid form and has a concentration of 20 to 100% by weight.

14. The method according to claim 12, wherein the urea has a concentration of more than 99% by weight.

15. The method according to claim 1, wherein the method is continuous.

* * * * *